(12) United States Patent
Cobb et al.

(10) Patent No.: US 11,836,562 B2
(45) Date of Patent: Dec. 5, 2023

(54) MULTI-PROTOCOL RFID TAG AND SYSTEM

(71) Applicant: PRAGMATIC PRINTING LTD., Sedgefield (GB)

(72) Inventors: Brian Hardy Cobb, Sedgefield (GB); Scott White, Sedgefield (GB)

(73) Assignee: PRAGMATIC PRINTING LTD., Sedgefield (GB)

( * ) Notice: Subject to any disclaimer, the term of this patent is extended or adjusted under 35 U.S.C. 154(b) by 0 days.

(21) Appl. No.: 17/311,754

(22) PCT Filed: Dec. 3, 2019

(86) PCT No.: PCT/GB2019/053410
§ 371 (c)(1),
(2) Date: Jun. 8, 2021

(87) PCT Pub. No.: WO2020/128425
PCT Pub. Date: Jun. 25, 2020

(65) Prior Publication Data
US 2022/0027701 A1 Jan. 27, 2022
US 2022/0343128 A9 Oct. 27, 2022

(30) Foreign Application Priority Data
Dec. 21, 2018 (GB) .................................... 1820967

(51) Int. Cl.
*G06K 19/07* (2006.01)
*G06K 7/10* (2006.01)
(52) U.S. Cl.
CPC ..... *G06K 19/0724* (2013.01); *G06K 7/10029* (2013.01); *G06K 7/10336* (2013.01); *G06K 7/10356* (2013.01)
(58) Field of Classification Search
None
See application file for complete search history.

(56) References Cited

U.S. PATENT DOCUMENTS 4,897,642 A * 1/1990 DiLullo ................ G01S 5/0009
  701/1
7,091,860 B2 * 8/2006 Martinez de Velasco Cortina .....
  G06K 19/07767
  340/10.2

(Continued)

FOREIGN PATENT DOCUMENTS

| EP | 2056234 A2 | 5/2009 |
| WO | WO 2006/030344 A1 | 3/2006 |
| WO | WO-2008016327 A1 * | 2/2008 ............. H01Q 21/28 |

OTHER PUBLICATIONS

International Preliminary Report on Patentabiiity for International Application No. PCT/GB2019/053410, dated Jul. 1, 2021.

(Continued)

*Primary Examiner* — Muhammad Adnan
(74) *Attorney, Agent, or Firm* — Jason H. Vick; Sheridan Ross, PC

(57) ABSTRACT

The present invention provides for a RFID tag assembly that is suitable for operation with at least one RFID reader assembly. The RFID tag assembly comprises, inter alia, an antenna member for transmitting and/or receiving an RFID signal, and at least one integrated circuit (IC) for processing the RFID signal and which is configured to communicate, alternatingly and sequentially in time, a first signal transmission and at least one second signal transmission, each defined by a plurality of predetermined signal transmission parameters, to the at least one RFI D reader assembly, utilising time-division multiplexing, wherein the at least one first signal transmission differs from the at least one second signal transmission in at least one of said plurality of predetermined signal transmission parameters.

19 Claims, 8 Drawing Sheets

(56) References Cited

U.S. PATENT DOCUMENTS

| | | | | |
|---|---|---|---|---|
| 7,132,946 B2* | 11/2006 | Waldner | ............ | G06K 19/0726 |
| | | | | 340/10.2 |
| 7,602,274 B2* | 10/2009 | Lee | ................ | G06K 19/07767 |
| | | | | 340/426.36 |
| 7,952,464 B2* | 5/2011 | Nikitin | ............... | G08B 13/2471 |
| | | | | 340/10.2 |
| 8,035,486 B1* | 10/2011 | Khieu | ................... | G06F 1/24 |
| | | | | 340/636.12 |
| 8,294,579 B2* | 10/2012 | Butler | ............... | G06K 19/0724 |
| | | | | 340/10.33 |
| 9,013,268 B2* | 4/2015 | Hill | ................. | G06K 7/10366 |
| | | | | 340/5.1 |
| 9,087,281 B2 | 7/2015 | Maguire | ............... | H01Q 21/30 |
| 9,449,265 B1* | 9/2016 | Maguire | ............... | H01Q 21/30 |
| 9,633,243 B1* | 4/2017 | Geist | ................... | G06Q 30/06 |
| 10,650,201 B1 | 5/2020 | Maguire | ........... | G06K 19/0724 |
| 2005/0052283 A1* | 3/2005 | Collins | .......... | G06K 19/07767 |
| | | | | 343/853 |
| 2006/0071793 A1* | 4/2006 | Pesavento | ......... | G06K 19/0723 |
| | | | | 340/572.1 |
| 2006/0133175 A1* | 6/2006 | Gutnik | ............... | G06K 19/0723 |
| | | | | 365/225.7 |
| 2006/0164212 A1* | 7/2006 | Roz | ................... | G06K 7/10336 |
| | | | | 340/10.2 |
| 2006/0224647 A1* | 10/2006 | Gutnik | ................... | G06F 7/582 |
| | | | | 708/250 |
| 2007/0213951 A1* | 9/2007 | Van Eeden | ......... | G06K 7/0008 |
| | | | | 702/81 |
| 2008/0084310 A1 | 4/2008 | Nikitin et al. | | |
| 2008/0238679 A1 | 10/2008 | Rofougaran et al. | | |
| 2008/0273579 A1* | 11/2008 | Rofougaran | ........ | H01Q 21/062 |
| | | | | 375/E7.002 |
| 2009/0040023 A1* | 2/2009 | Pretorius | ........... | G06K 19/0723 |
| | | | | 340/10.1 |
| 2009/0073070 A1* | 3/2009 | Rofougaran | ........ | H04B 5/0012 |
| | | | | 343/866 |
| 2009/0289771 A1* | 11/2009 | Tuttle | ...................... | H04Q 9/00 |
| | | | | 340/10.3 |
| 2012/0293307 A1* | 11/2012 | Djuric | ............... | G06K 7/10465 |
| | | | | 340/10.2 |
| 2013/0320096 A1* | 12/2013 | Springer | ............ | G06K 19/0723 |
| | | | | 235/492 |
| 2015/0087935 A1* | 3/2015 | Davis | ................ | A61B 5/14532 |
| | | | | 600/371 |
| 2016/0217345 A1* | 7/2016 | Appel | ..................... | G06T 7/20 |
| 2016/0292557 A1* | 10/2016 | Kolman | ............ | G06K 19/0724 |
| 2016/0371518 A1 | 12/2016 | Tuttle | | |
| 2017/0030853 A1* | 2/2017 | Hodges, Jr. | ............ | G06Q 10/06 |
| 2017/0095667 A1* | 4/2017 | Yakovlev | ........... | A61N 1/37235 |
| 2017/0116443 A1* | 4/2017 | Bolic | ....................... | H02J 50/20 |
| 2018/0000556 A1* | 1/2018 | Blair | ....................... | A61F 13/44 |
| 2018/0277957 A1* | 9/2018 | Geist | ...................... | H01Q 1/248 |
| 2019/0146051 A1* | 5/2019 | Seitz | ...................... | A47B 25/00 |
| | | | | 340/686.1 |
| 2021/0232883 A1* | 7/2021 | Forster | ............... | G06K 19/0723 |
| 2021/0248332 A1* | 8/2021 | Hennig | ............. | G06K 7/10227 |
| 2022/0138444 A1* | 5/2022 | Li | ..................... | G06K 7/10029 |
| | | | | 340/10.2 |

OTHER PUBLICATIONS

International Search Report for International Application No. PCT/GB2019/053410, dated Feb. 20, 2020.

Written Opinion for International Application No. PCT/GB2019/053410, dated Feb. 20, 2020.

Combined Search and Examination Report Under Sections 17 and 18(3) for Great Britain Application No. 1820967.6, dated June 20, 2919.

Belgiç, Mustafa Murat et al. "An HF/UHF Dual Mode RFID Transponder Antenna and HF Range Extension Using UHF Wireiess Power Transmission" Turkish Journal of Electrical Engineering & Computer Sciences; Jun. 25, 2015.

Ha-Van, Nam et al. "A Single-Feeding Port HF-UHF Dual-Band RFID Tag Antenna" Journal of Electromagnetic Engineering and Science, vol. 17, No. 4, 233-237; Oct. 2017

Bilgiç, Mustafa Murat et al. "An HF/UHF Dual Mode RFID Transponder Antenna and HF Range Extension Using UHF Wireless Power Transmission" Turkish Journal of Electrical Engineering & Computer Sciences; Jun. 25, 2015.

Diet, Antoine et al. "Detection Tube for Small HF RFID Tags, Based on Mutual Coupling with a Coil Resonator" Proceedings of the 45th European Microwave Conference; Sep. 2015.

EM Microelectronic "em | echo (EM4423)—NFC & High Frequency IC, EPC AND UHF ICs; Dual Frequency Rainfc Transponder IC" Date Unavailable.

Ha-Van, Nam et al. "A Single-Feeding Port HF-UHF Dual-Band RFID Tage Antenna" Journal of Electromagnetic Engineering and Science, vol. 17, No. 4, 233-237; Oct. 2017.

* cited by examiner

| ISO 18000 STANDARDS | |
|---|---|
| STANDARD CODE | DESCRIPTION |
| ISO 18000-V1 | Generic parameter for air interfaces globally accepted frequencies |
| ISO 18000-V2 | Air Interface 135 KHz |
| ISO 18000-V3 | Air Interface 13.56 MHz |
| ISO 18000-V4 | Air Interface 2.45 GHz |
| ISO 18000-V5 | Air Interface 5.8 GHz |
| ISO 18000-V6 | Air Interface 860 MHz – 960 MHz |
| ISO 18000-V7 | Air Interface 433.92 MHz |

(a)

| EPCGLOBAL TAG CLASSES | |
|---|---|
| CLASS 0 | Read Only Tags<br>• Read – Only Memory<br>• Passive Tags |
| CLASS 1 | Identity Tags<br>• Read – Only Memory<br>• Passive Tags |
| CLASS 2 | Higher Functionality Tags<br>• Read & Write Memory (up to 65KB) |
| CLASS 3 | Semi-Passive Tags<br>• Read & Write Memory (up to 65KB)<br>• Built-in battery to support increased read range |
| CLASS 4 | Active Tags<br>• Allows active communication<br>• Built-in battery to support increased read range<br>• Allows tags to be networked with each other |
| CLASS 5 | Active RFID Tags<br>• Allows communication with Class 4 & 5 tags and/or other devices |

MULTI-PROTOCOL RFID TAG AND SYSTEM

CROSS-REFERENCE TO RELATED APPLICATIONS

This application is a national stage application under 35 U.S.C. 371 of PCT Application No. PCT/GB2019/053410 having an international filing date of 3 Dec. 2019, which designated the United States, which PCT application claimed the benefit of Great Britain Application No. 1820967.6, filed 21 Dec. 2018, each of which are incorporated herein by reference in their entirety.

The present invention generally relates to wireless RF (Radio Frequency) communication and particularly to an electronic tag such as a RFID (Radio Frequency Identification) tag adapted to simultaneously communicate with one or more reader(s) utilising different communication protocols/standards.

INTRODUCTION

Applications of radio-frequency identification (RFID) are widespread in today's well-connected world. RFID uses radio frequency (RF) signals to identify and track objects, such as, for example, vehicles, shipping containers, equipment, tools and even personnel utilising so called tags (i.e. transponders) that are attached to the object. In some cases, RFID may also be used to provide information about the tracked object's state, such as, for example, temperature, humidity or a precise location.

Typically, RFID systems are categorised according to the operating carrier frequency. For example, Low-Frequency (LF) RFID operates at 125 KHz to 134 KHz (kilohertz), offering data communication that is limited to data rates of less than 1 kbits/s (kilobits per second) and operating ranges of less than 1 m (meter). High-Frequency (HF) RFID operates at 13.56 MHz (megahertz) offering data communication with data rates approaching 25 kbits/s and operating ranges of up to 1.5 m. Ultra-High-Frequency (UHF) RFID typically operates in the 860 MHz to 960 MHz frequency band offering data rates of up to 100 kbits/s and operating ranges of up to 10 m. Microwave (MW) RFID operates at 2.45 GHz and 5.8 GHz (gigahertz) offering further increase in data rates and operating range.

Depending on their operating principle, tags may be classified into three categories (i) passive tags, (ii) semi-passive tags and (iii) active tags. Passive tags have no internal power supply and utilise the signal energy transmitted by the reader (i.e. interrogator) to power the tags' internal circuit and communicate with the reader. Semi-active tags have an internal power supply, but the tags are only activated to establish communication when "interrogated" by a reader. Active tags have an internal power supply, such as, for example, a battery, and a transmitter that is periodically transmitting the tag's ID or other tag information. The ID and/or other tag information is then picked up by an interrogating reader to simply track an associated object, or to establish a communication link between the reader and the tag.

FIG. 1 shows a simplified illustration of a typical RFID system 10 where a first tag 12 is attached to an object 14 tracked by a first reader 16 (Reader 1) that is configured to "couple" with the tag 12 via a first communication protocol. In order to allow a second reader 18 (Reader 2) to track the object 14 using a second communication protocol, a second tag 20 has to be attached to the object 14.

In general, RFID operates according to international and national standards and within a number of distinct frequency bands dedicated to respective standards. The International Standards Organisation (ISO) and EPCglobal (Electronic Product Code) are two organisations that work together to approve standards and protocols in order to provide universal specifications for RFID equipment. Once ratified, these protocols define communication methods approved with the air interface in conjunction with the operating frequency, channel bandwidth, data transmission rate, etc. The protocol also defines how the information is coded, how it is modulated, as well as any anti-collision protocol used.

There are basically two types of protocols to establish communication between tag and reader (i.e. interrogator), (i) "Tag-Talks-First" (TTF), where the tag initiates communication with the reader, and (ii) "Reader-Talks-First) (RTF), where the reader initiates the communication with the tag. Tag-Talks-Only (TTO) and Tag-Only-Talks-After-Listening (TOTAL) are variants of TTF, i.e. with TTO the reader sends no commands to the tag, instead, the tag just sends it's ID code and any other additional information at intervals whenever the tag enters the reader's RF "energy" beam (for passive tags).

In addition, many systems use proprietary air interfaces, so that tags and readers must come from the same manufacturer to allow communication.

Consequently, many different RFID protocols/standards have been developed over the past few decades, and each has tended to be applied to specific applications. This generally means that if an item needs to communicate over more than one RFID protocol it needs to have two tags fixed to it, each tag containing an antenna and an RFID chip (i.e. IC). Other available tags may utilise two or more separate antennas to provide communication in different frequency bands, or a dual-band antenna that is coupled to two separate ICs. However, this raises the cost of the item considerably and precludes low cost items from access to such multi-protocol systems. Whilst dual mode IC's are known, they duplicate many features, e.g. they have two antennas, two antenna interfaces, two modulators, etc. This also adds cost and size to the tag.

FIG. 2 (a) shows an example of one of the main RFID standards, ISO 18000, which is a standard for the air interface for RFID frequencies around the world. There are numerous other standards under ISO including, inter alia, RFID standards for close-coupled cards, payment systems, used in supply chain, and so on. FIG. 2 (b) shows a series of classes for RFID tags under EPC Global.

Accordingly, it is an object of the present invention to provide a RFID system, and in particular a RFID tag that is adapted to "communicate" with different readers using different protocols and standards and which provides additional and improved functionality, but without the added complexity of known RFID tags and systems.

SUMMARY OF THE INVENTION

Preferred embodiment(s) of the invention seek to overcome one or more of the disadvantages of the prior art.

According to a first embodiment of the invention, there is provided a RFID tag assembly for operation with at least one RFID reader assembly, comprising an antenna member for transmitting and/or receiving an RFID signal; and at least one integrated circuit (IC) for processing the RFID signal and which is configured to communicate, alternatingly and sequentially in time, a first signal transmission and at least one second signal transmission, each defined by a plurality of predetermined signal transmission parameters, to the at least one RFID reader assembly utilising time-division multiplexing, wherein said at least one first signal transmission differs from said at least one second signal transmission in at least one of said plurality of predetermined signal transmission parameters.

The use of time-division multiplexing to provide different, sequentially arranged signal transmissions, allows for one tag (i.e. a single antenna and/or IC, active or passive) to (almost) simultaneously provide its ID (or other information) via one or more protocols and/or standards, but also to selectively provide different information via different protocols, i.e. so as to send different information to different readers. Therefore, the tag design can be kept relatively simple minimising manufacturing costs, as well as, tag dimensions.

Advantageously, said plurality of predetermined signal transmission parameters may be any one of (i) at least one predetermined information, (ii) at least one parameter of at least one RFID standard and (iii) a time stamp. Preferably, said at least one parameter of said at least one RFID standard may be any one of a signal carrier frequency, a data transmission rate and an encoding scheme.

Advantageously, said IC may comprise a memory device, configured to store at least said predetermined information; an encoder device, configured to apply said at least one encoding scheme to the RFID signal; a clock generator, configured to provide at least one first clock signal; a signal modulator, adapted to modulate said RFID signal according to at least one modulation process; and a controller, configured to control any one of said at least one memory, said at least one encoder, said clock generator and said signal modulator.

Advantageously, said memory device may comprise a first memory, configured to store a first predetermined information, and at least one second memory, configured to store a second information.

Advantageously, said encoder device may comprise a first encoder, adapted to apply a first encoding scheme to the RFID signal, and at least one second encoder, adapted to apply a second encoding scheme to the RFID signal.

Advantageously, said clock generator may comprise a first clock, configured to generate said at least one first clock signal, and at least one second clock, configured to generate at least one second clock signal.

Advantageously, said signal modulator may be a load modulator. Preferably, said load modulator may be adapted to provide any one of near-field-(NFC) or inductive coupling, and, far-field or backscatter coupling.

Advantageously, said load modulator may be adapted to utilise any one of an Amplitude-Shift-Keying (ASK) scheme, Frequency-Shift-Keying (FSK) and a Phase-Shift-Keying (PSK) scheme.

Advantageously, said antenna member may be a single antenna, configured to transmit and/or receive an RFID signal of a first signal frequency. Additionally, said single antenna may be a multi-resonant antenna adapted to transmit and/or receive an RFID signal of said first signal frequency and at least one RFID signal of a second signal frequency. Even more preferably, said first signal frequency may be a Ultra-High-Frequency (UHF) and said second signal frequency may be any one of a High-Frequency (HF) and Low-Frequency (LF).

Advantageously, said at least one RFID standard may be any one of a UHF air interface protocol, a HF air interface protocol and a LF air interface protocol.

Advantageously, said tag assembly may comprise at least one passive tag configured to utilise any one of a Tag-Talks-First (TTF) protocol, a Tag-Talks-Only protocol and a Tag Talks Only After Listening (TOTAL) protocol.

Advantageously, said IC may further comprise a power generator adapted to provide energy to said IC from the RFID signal.

Alternatively, said tag assembly may comprise at least one active tag, configured to utilise any one of a Tag-Talks-First (TTF) protocol, Tag-Talks-Only protocol and Tag Talks Only After Listening (TOTAL) protocol.

According to a second embodiment of the invention, there is provided a RFID system, comprising at least one tag assembly according to any one of the preceding claims, and at least one reader assembly, configured to operatively and communicatively couple with said at least one tag assembly.

BRIEF DESCRIPTION OF THE DRAWINGS

Preferred embodiments of the present invention will now be described, by way of example only and not in any limitative sense, with reference to the accompanying drawings, in which:

FIG. 2 (Prior Art) shows examples of typical ISO 18000 air interface standards and EPC Global tag classes;

DETAILED DESCRIPTION OF THE PREFERRED EMBODIMENT(S)

The exemplary embodiments of this invention will be described in relation to RFID systems, and in particular to RFID systems using TTO tag(s) that are configured to receive power from an interrogating reader (passive tag), but also battery-powered TTO tag(s) that are configured to continuously broadcast information, either autonomously or when activated by an interrogating reader. As non-limiting examples, the tag(s) could be operated at 860 MHz to 960 MHz, 13.56 MHz or 125/134 KHz and according to any one of the standards and classes shown in FIGS. 2 (a) and (b).

However, it is understood by a person skilled in the art that any other suitable tag design (passive, semi-passive, active) may be used in connection with this invention. Also, it is understood that the scope of the invention is not limited to the specific design described for the example embodiment(s).

Further, in the context of this particular example of the present invention, signal transmission includes the emission of a radio wave, but also the modulation of a "load" presented to a reader by a tag, in order to communicate information from the tag to the reader.

Figure 1:
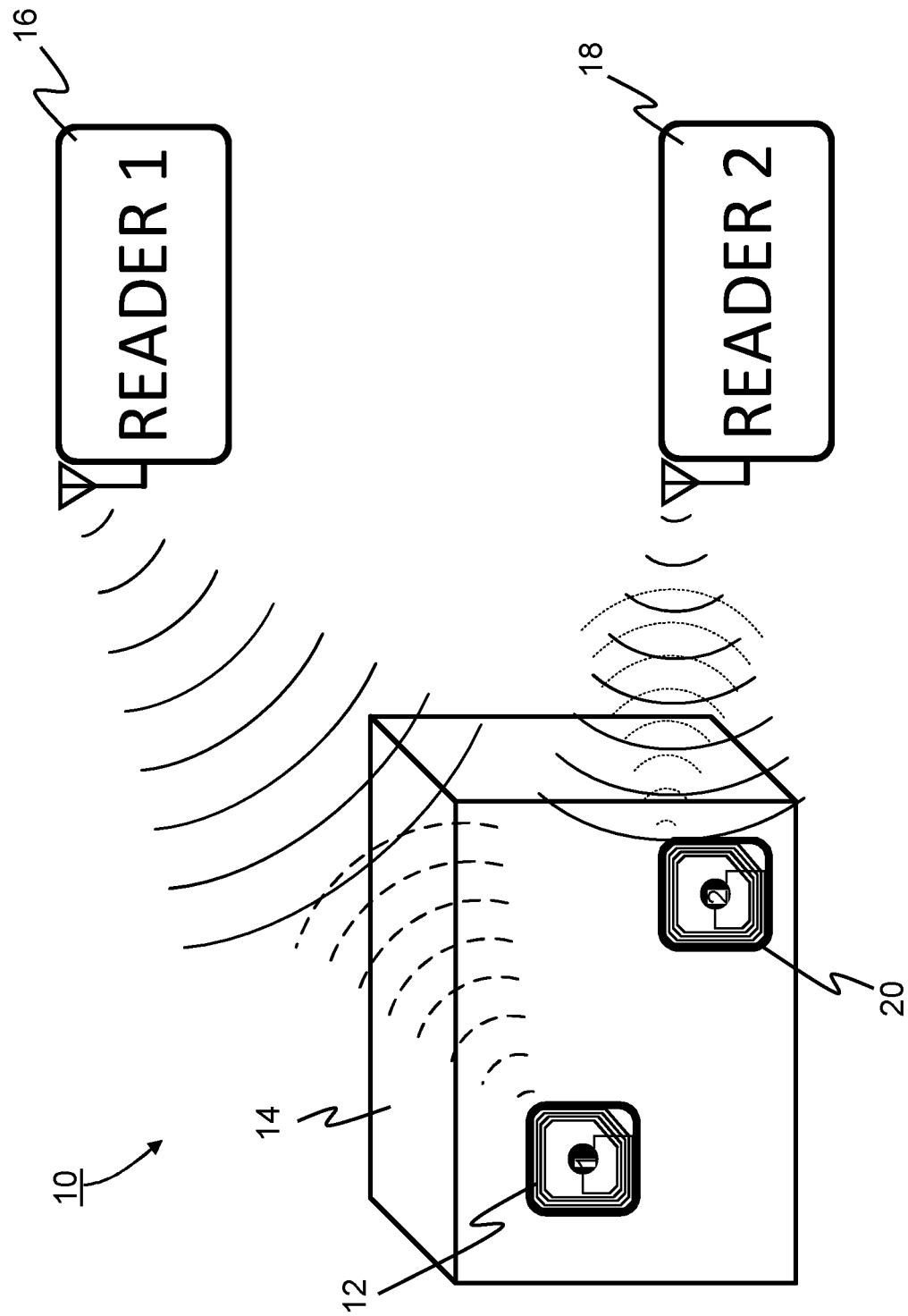
FIG. 1 (Prior Art) is a simplified schematic illustration of a typical RFID system, including a first reader (or interrogator) configured to communicate with a first tag and a second, different reader configured to communicate with a second tag.
Figure 3:
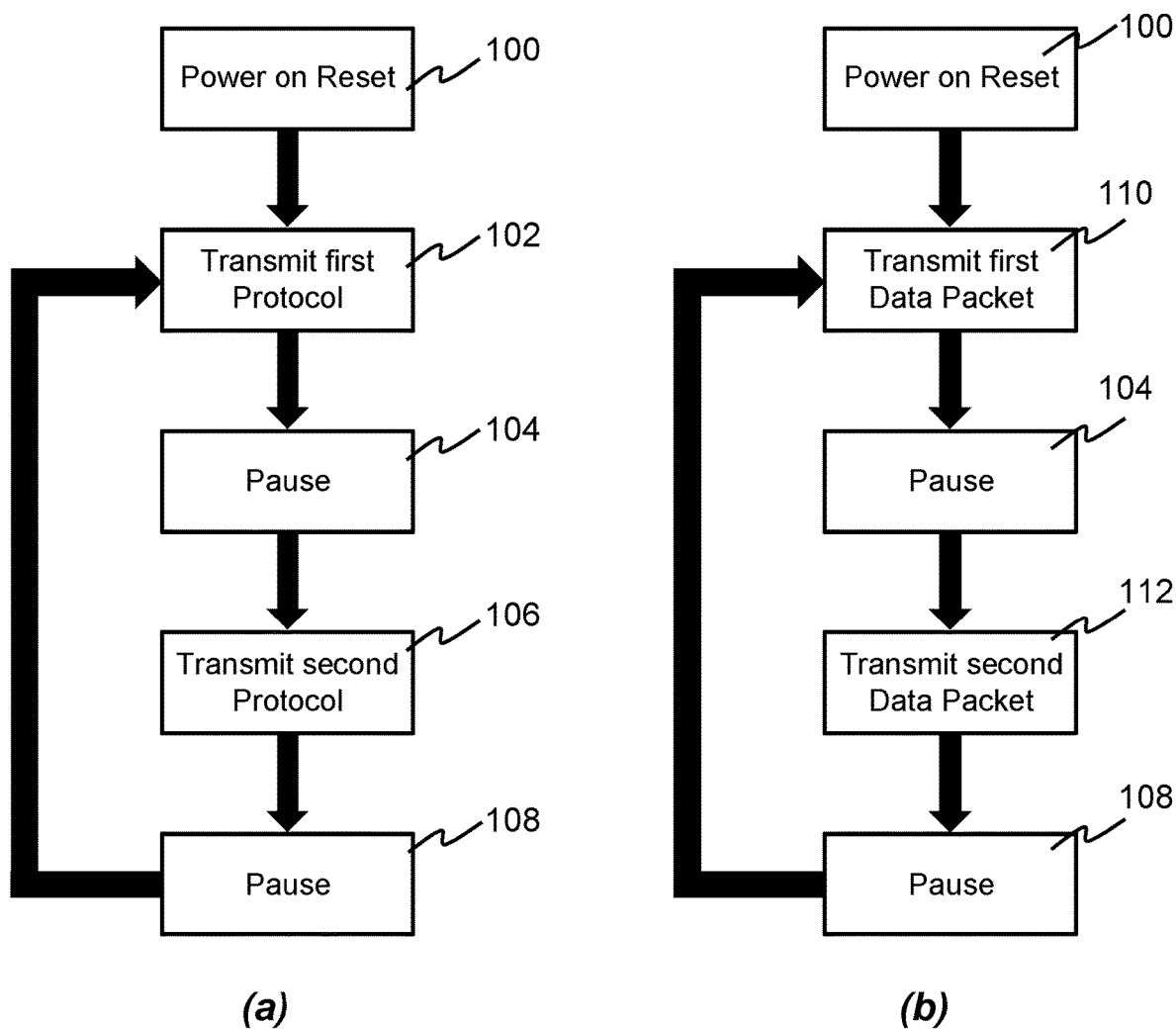
FIG. 3 shows flow charts of the sequence of steps for the time-division multiplexed signal transmissions: (a) signal transmissions via different protocols and (b) signal transmissions with different data packets.

FIGS. 3 (a) and (b) show flow charts of two example operation schemes for a TTO tag of the present invention. In particular, as illustrated in FIG. 3 (a), the tag operation (executed by the IC) includes the sequential step of 'Power on Reset' 100, followed by the 'Transmit first Protocol' step 102, a 'Pause' 104, followed by a 'Transmit second Protocol' step 106 and another 'Pause' 108, the sequence may then be repeated, i.e. going back to step 'Transmit first Protocol' step 102. The step 'Transmit first Protocol' 102 and 'Transmit second Protocol' 106 may be replaced by the alternative steps 'Transmit first data packet' 110 and 'Transmit second data packet' 112, as shown in the example of FIG. 3 (b).

However, it is understood by the person skilled in the art that the sequentially repeating and alternating signal transmissions are not limited to the illustrated two different signal transmissions but may be any number of different signal transmissions alternating at any suitable iteration pattern. The signal transmissions may differ in any one or any combination of a suitable signal transmission characteristic, such as, for example, the communication protocol/standard including, inter alia, the carrier frequency, data transmission rate, the modulation scheme applied, but the distinguishing signal transmission characteristic may also be the actual data content, or a time stamp given to a separate signal transmission.

In a specific example, a single RFID tag/IC may operate with a single antenna by alternating between different transmitted bursts (signal transmissions) in a Tag Talks Only (TTO) mode, repeatedly broadcasting its alternating information whilst receiving power (and potentially listening for modulation) but interpreting no data or commands from a reader. As a result, the tag of the present invention is compatible with multiple different reader systems and/or can broadcast different sets of data at a predetermined rate/pattern. Embodiments of the present invention include tags that may operate at a single carrier frequency utilising a single antenna, but it also includes tags that may operate at multiple frequencies utilising a single antenna interface. In this specific example, all IC controlled signal transmissions are in the form of load modulation (i.e. backscattering or inductive coupling) and respective different signal transmissions may employ different load modulation schemes, e.g. one first signal transmission may use amplitude modulation (amplitude shift keying, ASK) and the other may use phase modulation (phase shift keying, PSK). However, as mentioned before, it is understood by the person skilled in the art, that the present invention allows for any suitable modulation scheme.

Furthermore, envisaged signal transmission iteration patterns may include a symmetric, asymmetric, regular, irregular or random order. For example, two different signal transmissions 'A' and '13' (e.g. differing in the communication protocol used) may be time-division multiplexed in an order, such as, "A-A-B-A-A-B- . . . ", or "A-B-A-A-B-B- . . . ". It is understood by the person skilled in the art, that any other order and/or number of different signal transmissions may be used without departing from the inventive concept of the present invention.

Figure 4:
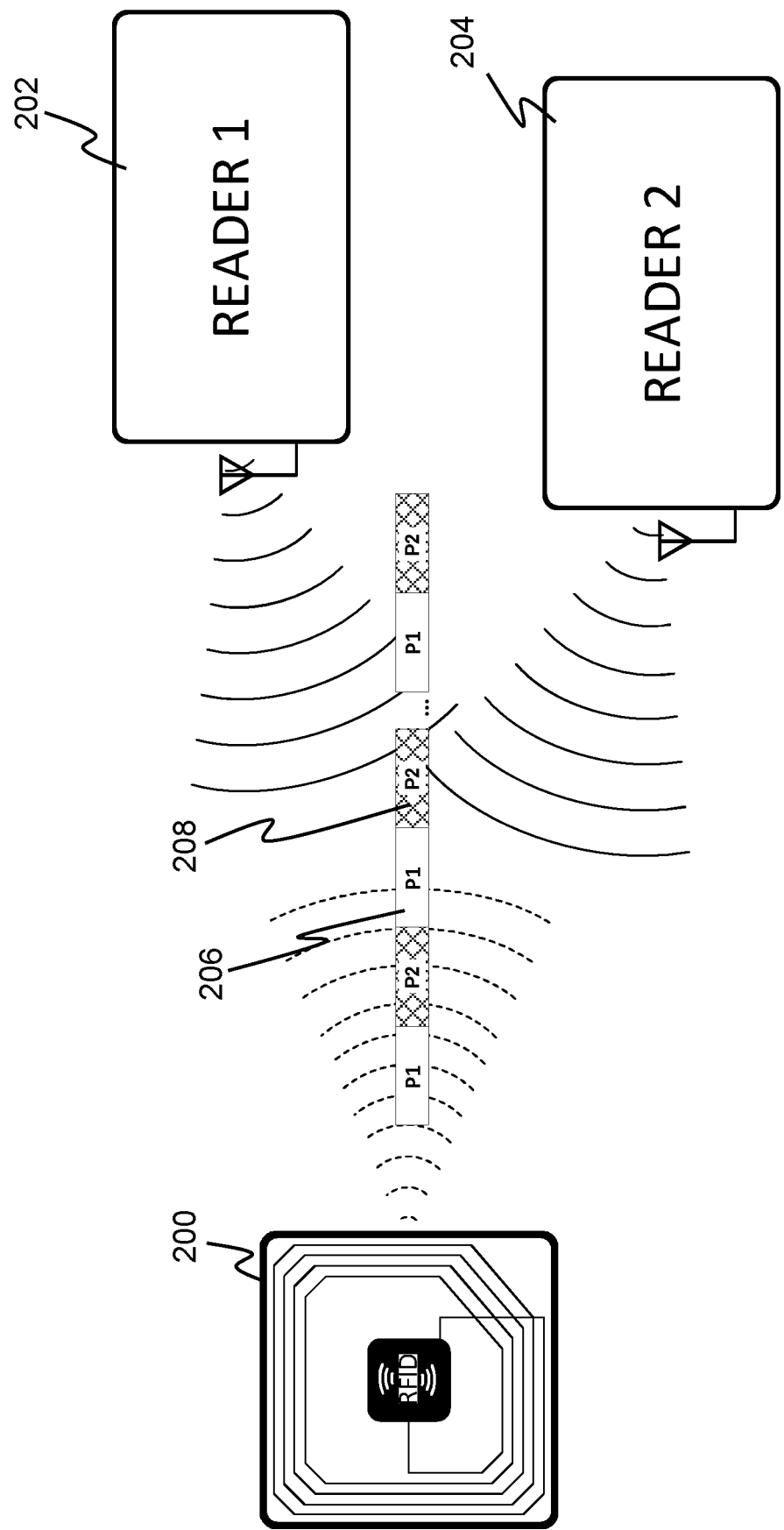
FIG. 4 shows a simplified schematic illustration of a RFID system comprising a tag of the present invention configured to provide information to two different readers, each utilising a different protocol or standard.

FIG. 4 shows a simplified schematic illustration of a RFID system including a tag 200 of the present invention, as well as, a first reader 202 and second reader 204, each one of the readers 202, 204 using a different communication protocol to "communicatively couple" with the tag 200. In particular, tag 200 provides sequentially arranged (time-division multiplexed) signal transmission (e.g. via load modulation) including alternating signal "bursts" of a first 206 and second signal transmission 208, wherein the first signal transmission 206 applies the communication protocol used by the first reader 202 and the second signal transmission 208 applies the communication protocol used by the second reader 204.

IC Architecture Examples

FIGS. 5 to 8 show simplified illustrations of examples of different IC architecture designs.

Figure 5:
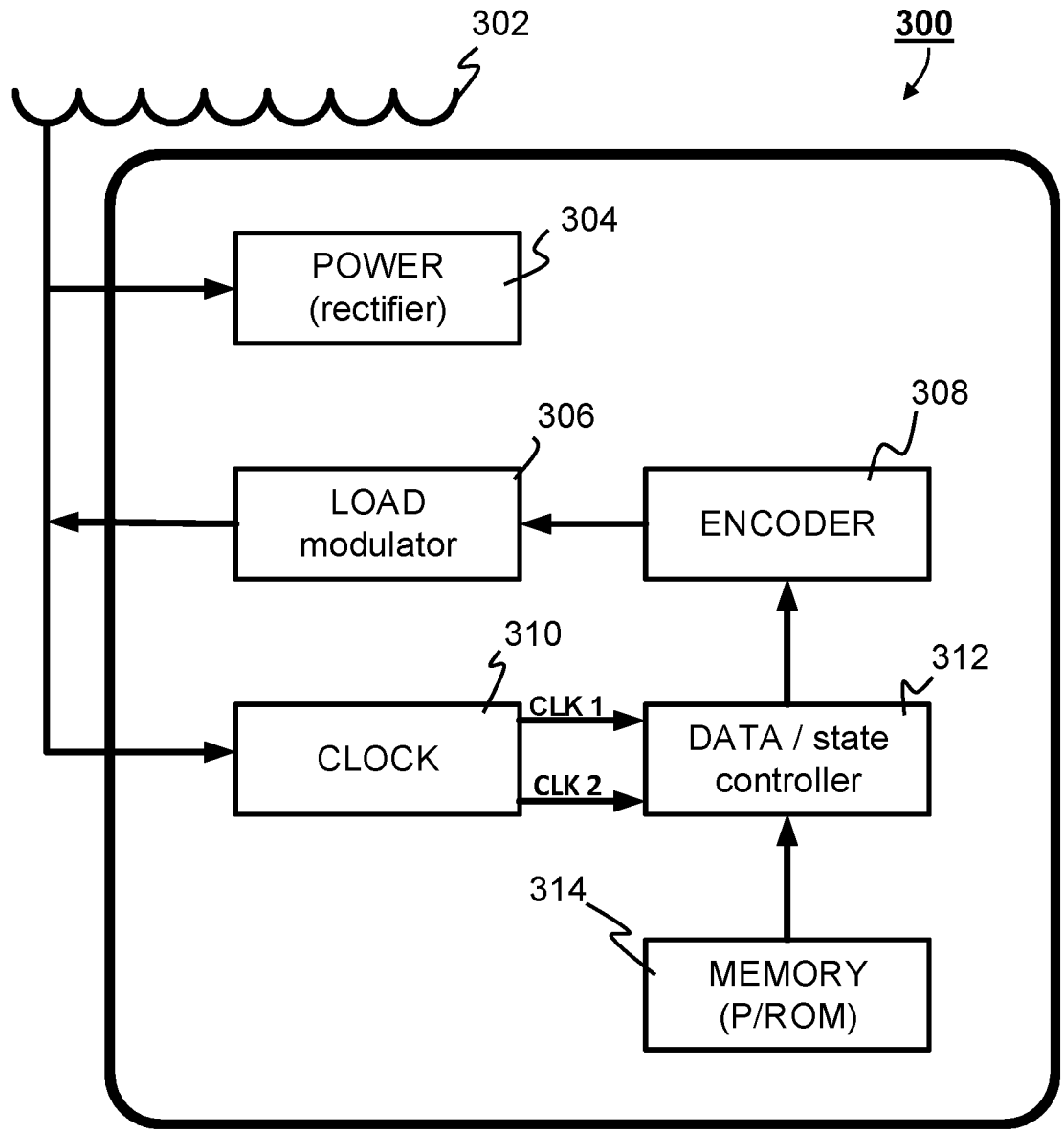
FIG. 5 shows a simplified schematic illustration of a first example embodiment of the IC architecture of a tag IC of the present invention, adapted to transmit the same data (from Memory) at two different data transmission rates.

FIG. 5 shows a block diagram of an IC 300 (e.g. FlexIC, PragmatIC®), comprising an antenna 302 (e.g. simple loop or coil), a power rectifier 304 and load modulator 306, as well as, an encoder 308, clock 310, controller 312 and a memory 314. The encoder 308 is configured to simply provide a single encoding scheme, wherein the clock 310 is adapted to provide at least a first clock signal (CLK1) and a second clock signal (CLK2). The memory 314 may store basic ID tag information but may also include additional information. A tag comprising an IC 300, as shown in FIG. 5, may alternate between signal transmissions at two different data rates, each signal transmission including the same data (from memory 314).

Figure 6:
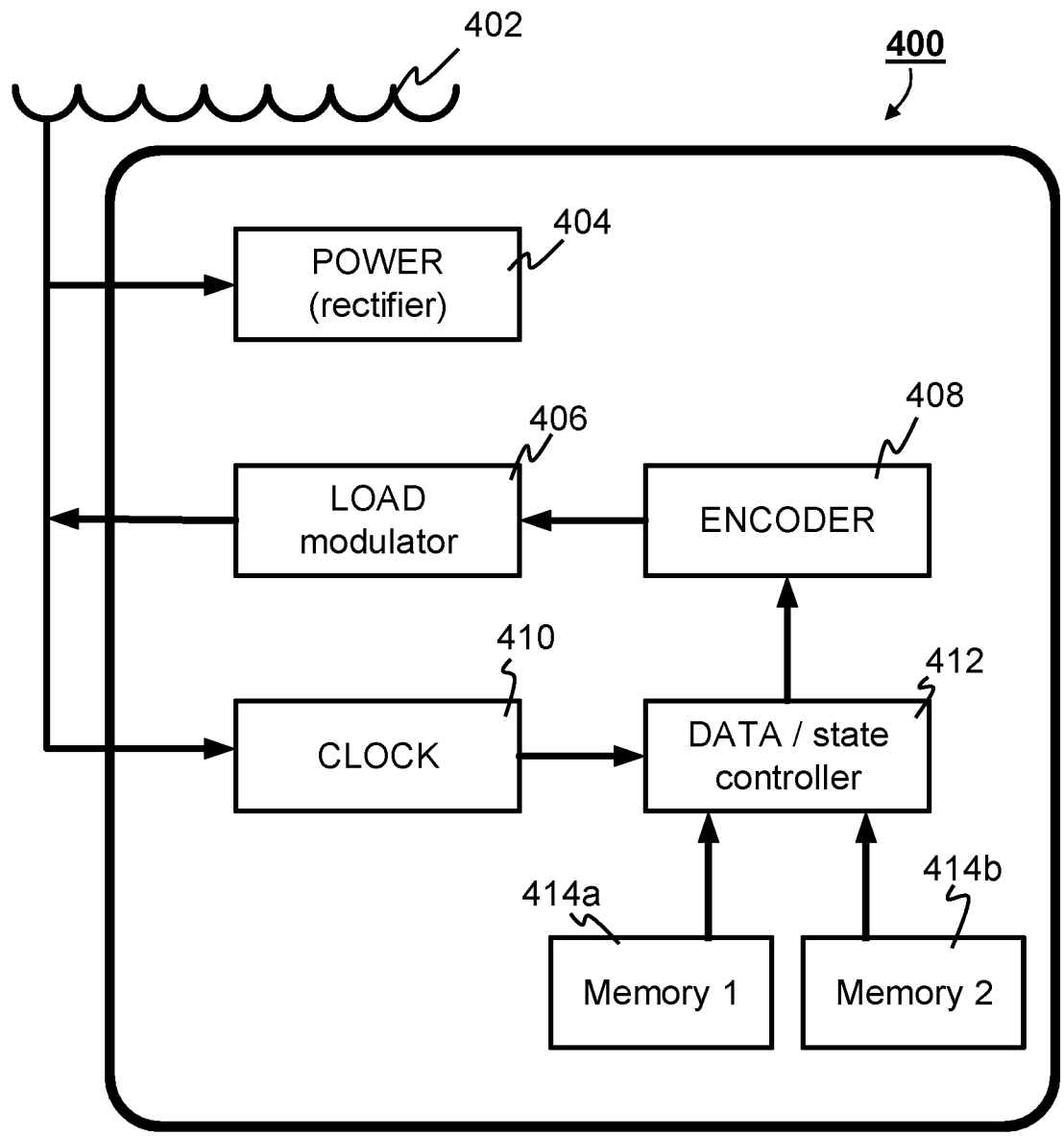
FIG. 6 shows a simplified schematic illustration of a second example embodiment of the IC architecture of a tag IC of the present invention, adapted to transmit two different sets of data (from Memory 1 and Memory 2) at the same data transmission rate.

The block diagram of the IC 400 illustrated in FIG. 6, comprises a first memory 414a storing first data, and a second memory 414b storing second data. The other components are identical to the architecture of the IC 300 shown in FIG. 5, i.e. antenna 402, power rectifier 404, load modulator 406, encoder 408, clock 410, and controller 412. A tag comprising IC 400 may be adapted to alternate between transmitting two different sets of data, using the same data rate, but may also alternate between transmitting two different sets of data, each using a different data rate (CLK1 or CLK2).

Figure 7:
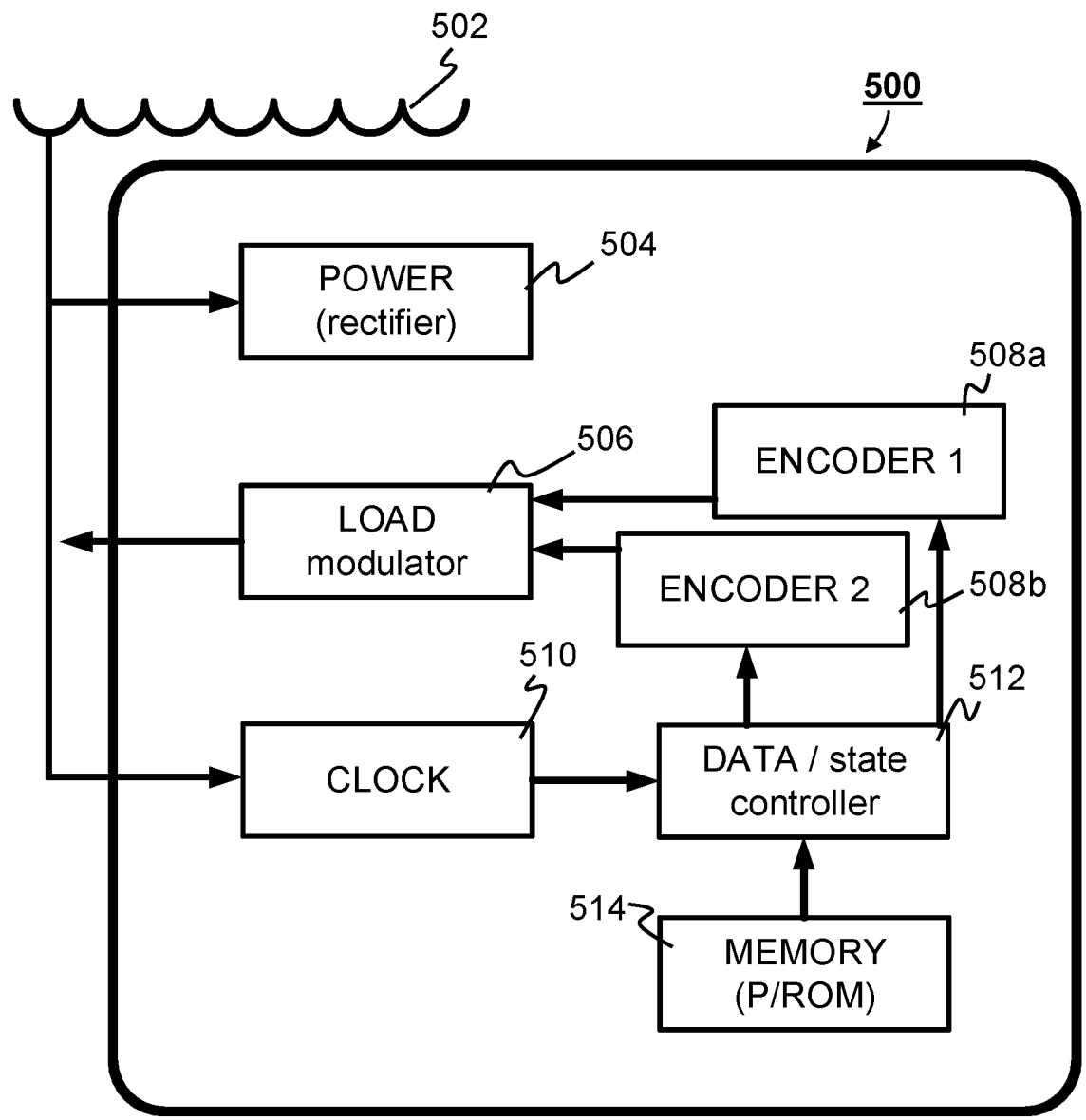
FIG. 7 shows a simplified schematic illustration of a third example embodiment of the IC architecture of a tag IC of the present invention, adapted to transmit the same data (from Memory) in two different encoding schemes.

FIG. 7 shows a block diagram of IC 500, further comprising a first encoder 508a configured to apply a first encoding scheme, and a second encoder 508b configured to apply a second encoding scheme. The other components are similar to the architecture of the IC 300 shown in FIG. 5, i.e. antenna 502, power rectifier 504, load modulator 506, clock 510 (only one CLK signal), controller 512 and memory 514. A tag comprising IC 500 may be adapted to alternate between transmitting in two different encoding schemes.

Figure 8:
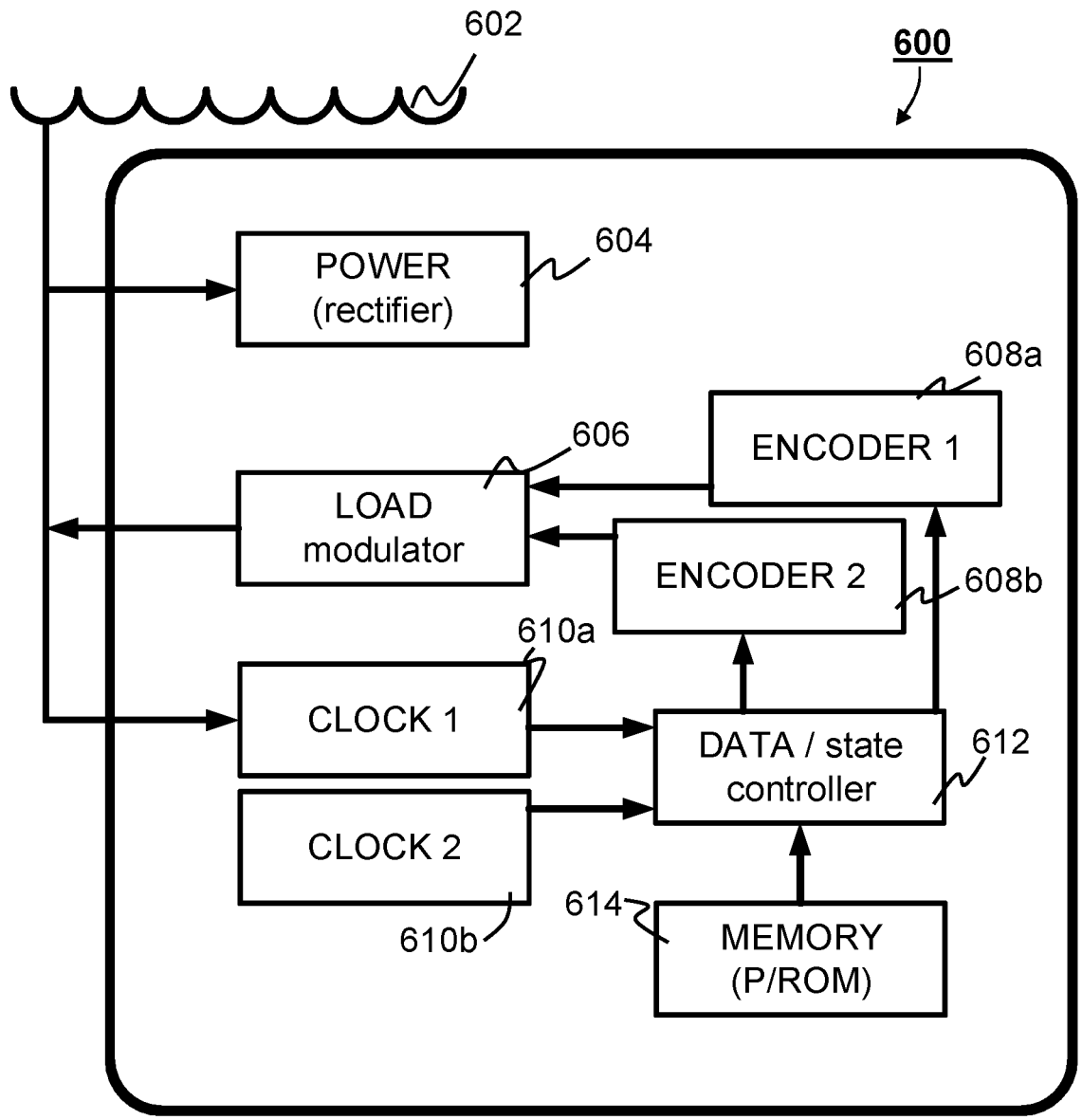
FIG. 8 shows a simplified schematic illustration of a fourth example embodiment of the IC architecture of a tag IC of the present invention, adapted to transmit the same data (from Memory) in two different encoding schemes, wherein one of which utilises an internally-generated clock (Clock 2).

FIG. 8 shows a block diagram of IC 600, comprising a first encoder 608a configured to apply a first encoding scheme, and a second encoder 608b configured to apply a second encoding scheme, but also a first clock 610a, adapted to provide a first clock signal from the carrier frequency of the RF signal received from the reader, and a second clock 610b, adapted to provide an internally-generated clock signal. The other components are similar to the architecture of the IC 300 shown in FIG. 5, i.e. antenna 602, power rectifier

604, load modulator 606, controller 612 and memory 614. A tag comprising IC 600 may be adapted to alternate between transmitting in two different encoding schemes, one of which uses the internally generated clock signal.

As can be envisaged from the described example embodiments, the invention allows the design and development of a single IC 300, 400, 500, 600 adapted to transmit different protocols that are separated in the time domain. Consequently, IC and tag costs are kept at a minimum, in particular, by using a single antenna and a minimized number of bond pads, as well as, a minimum of fabrication steps over currently available prior art (i.e. tags combining two separate ICs on a single tag, or two separate tags within a single tag, or a single IC with two antennas).

In one specific example, the tag of the present invention may be a HF tag that is compatible with both (i) proximity readers, such as a smartphone, transmitting information via NFC designed to enable interaction with a consumer and (ii) vicinity readers with a longer range, designed for track and trace interactions within the supply chain. Alternatively, a first broadcast (i.e. first signal transmission) may direct a standards-based smartphone (reader) to a website and a second broadcast (signal transmission) may contain more detailed proprietary information that is interpreted by a custom reader. In another alternative example, a first broadcast (i.e. first signal transmission) may direct a standards-based smartphone (reader) to a website and a second broadcast (signal transmission) may contain more detailed information that is interpreted by software (e.g. an App) installed on the smartphone.

As mentioned above, a single antenna may be used for multi-frequency operation. A suitable antenna may be a multi-resonant antenna employed to enable reception and transmission at two or more different frequencies via a single two-contact interface or feed. Multi-resonant antennas are known in the art and are not described in any more detail.

A dual-frequency operation may also enable operational range extension by supplying energy to the IC 300, 600 at one frequency, whilst receiving transmissions from the IC 300, 600 at a second frequency. For example, energy received at a higher frequency may supplement that received at a HF frequency, allowing HF communication with an extended range during a HF protocol burst (i.e. signal transmission) between bursts of signal transmissions at a higher frequency.

It will be appreciated by persons skilled in the art that the above embodiment(s) have been described by way of example only and not in any limitative sense, and that various alterations and modifications are possible without departing from the scope of the invention as defined by the appended claims.

The invention claimed is:

1. A passive Tag-Talks-Only (TTO) Radio-Frequency Identification (RFID) tag assembly configured for operation with at least one RFID reader assembly, comprising:
   an antenna member configured to transmit and/or receive an RFID signal;
   at least one integrated circuit (IC) configured to respond to a single received RFID signal immediately after a power on reset and without interpreting data or commands from the at least one RFID reader assembly, by communicating, alternatingly and sequentially in time, a first signal transmission and at least one second signal transmission, each defined by a plurality of predetermined signal transmission parameters, to the at least one RFID reader assembly utilising time-division multiplexing, wherein said at least one first signal transmission uses a first communication protocol and said at least one second signal transmission uses a second communication protocol different from said first communication protocol.

2. The RFID tag assembly according to claim 1, wherein said plurality of predetermined signal transmission parameters are any one of (i) at least one predetermined information, (ii) at least one parameter of at least one RFID standard and (iii) a time stamp.

3. The RFID tag assembly according to claim 2, wherein said at least one parameter of said at least one RFID standard is any one of a signal carrier frequency, a data transmission rate and an encoding scheme.

4. The RFID tag assembly according to claim 3, wherein said IC comprises:
   a memory device, configured to store at least said predetermined information;
   an encoder device, configured to apply said at least one encoding scheme to the transmission signals;
   a clock generator, configured to provide at least one first clock signal;
   a signal modulator, adapted to modulate said transmission signals according to at least one modulation process;
   a controller, configured to control any one of said at least one memory, said at least one encoder, said clock generator and said signal modulator.

5. The RFID tag assembly according to claim 4, wherein said memory device comprises a first memory, configured to store a first predetermined information, and at least one second memory, configured to store a second information.

6. The RFID tag assembly according to claim 4, wherein said encoder device comprises a first encoder, adapted to apply a first encoding scheme to the transmission signals, and at least one second encoder, adapted to apply a second encoding scheme to the transmission signals.

7. The RFID tag assembly according to claim 4, wherein said clock generator comprises a first clock, configured to generate said at least one first clock signal, and at least one second clock, configured to generate at least one second clock signal.

8. The RFID tag assembly according to claim 4, wherein said signal modulator is a load modulator.

9. The RFID tag assembly according to claim 8, wherein said load modulator is adapted to provide any one of near-field- (NFC) or inductive coupling, and, far-field or backscatter coupling.

10. The RFID tag assembly according to claim 8, wherein said load modulator is adapted to utilise any one of an Amplitude-Shift-Keying (ASK) scheme, Frequency-Shift-Keying (FSK) and a Phase-Shift-Keying (PSK) scheme.

11. The RFID tag assembly according to claim 2, wherein said at least one RFID standard is any one of a UHF air interface protocol, a HF air interface protocol, and a LF air interface protocol.

12. The RFID tag assembly according to claim 1, wherein said antenna member is a single antenna, configured to transmit and/or receive an RFID signal of a first signal frequency.

13. The RFID tag assembly according to claim 12, wherein said single antenna is a multi-resonant antenna adapted to transmit and/or receive an RFID signal of said first signal frequency and at least one RFID signal of a second signal frequency.

14. The RFID tag assembly according to claim 13, wherein said first signal frequency is a Ultra-High-Frequency (UHF) and said second signal frequency is any one of a High-Frequency (HF) and Low-Frequency (LF).

15. The RFID tag assembly according to claim 1, wherein said IC further comprises a power generator adapted to provide energy to said IC from the received RFID signal.

16. A Radio-Frequency Identification (RFID) tag assembly according to claim 1, further comprising:
the at least one RFID reader assembly, the at least one RFID reader assembly configured to operatively and communicatively couple with said at least one RFID tag assembly.

17. The RFID tag according to claim 1, wherein said first communication protocol or said second communication protocol is different from a communication protocol used by the RFID reader from which said single RFID signal is received.

18. A device comprising:
a passive Tag-Talks-Only (TTO) Radio-Frequency Identification (RFID) tag assembly configured for operation with at least one RFID reader assembly, including:
an antenna configured to receive signal energy transmitted by the at least one RFID reader assembly and to transmit an RFID signal in response thereto;
at least one integrated circuit (IC) configured to:
respond to a single received RFID signal immediately after a power on reset and without interpreting data or commands from the at least one RFID reader assembly, by
transmitting, alternatingly and sequentially in time, a first signal transmission and at least one second signal transmission, each defined by a plurality of predetermined signal transmission parameters, to the at least one RFID reader assembly utilising time-division multiplexing, wherein said at least one first signal transmission uses a first communication protocol and said at least one second signal transmission uses a second communication protocol different from said first communication protocol.

19. The device according to claim 18, wherein said first communication protocol or said second communication protocol is different from a communication protocol used by the RFID reader from which said single RFID signal is received.

* * * * *